United States Patent
Ting

(10) Patent No.: US 8,476,783 B2
(45) Date of Patent: Jul. 2, 2013

(54) WIND ENERGY GENERATOR USING PIEZOELECTRIC MATERIAL AND AUXILIARY MECHANISM THEREOF

(75) Inventor: Yung Ting, Tao Yuan County (TW)

(73) Assignee: Chung-Yuan Christian University, Chung Li, Tao Yuan County (TW)

( * ) Notice: Subject to any disclaimer, the term of this patent is extended or adjusted under 35 U.S.C. 154(b) by 405 days.

(21) Appl. No.: 13/005,834

(22) Filed: Jan. 13, 2011

(65) Prior Publication Data

US 2012/0038250 A1     Feb. 16, 2012

(30) Foreign Application Priority Data

Aug. 13, 2010   (TW) .............................. 99127154 A

(51) Int. Cl.
    *H02P 9/04*       (2006.01)
(52) U.S. Cl.
    USPC .............................................. 290/55; 290/44
(58) Field of Classification Search
    USPC ..................................................... 290/44, 55
    See application file for complete search history.

(56) References Cited

U.S. PATENT DOCUMENTS

| | | | | |
|---|---|---|---|---|
| 84,237 | A * | 11/1868 | Waite | 415/75 |
| 299,127 | A * | 5/1884 | Garrigus | 415/2.1 |
| 1,345,022 | A * | 6/1920 | Oliver | 415/4.3 |
| 1,496,767 | A * | 6/1924 | Bonetto | 415/2.1 |
| 2,616,506 | A * | 11/1952 | Mathias | 415/207 |
| 4,387,318 | A * | 6/1983 | Kolm et al. | 310/330 |
| 4,406,579 | A * | 9/1983 | Gilson | 415/2.1 |
| 4,467,236 | A * | 8/1984 | Kolm et al. | 310/321 |
| 4,536,674 | A * | 8/1985 | Schmidt | 310/330 |
| 4,854,177 | A * | 8/1989 | Phipps et al. | 73/861.24 |
| 5,223,763 | A * | 6/1993 | Chang | 310/339 |
| 5,861,703 | A * | 1/1999 | Losinski | 310/330 |
| 6,308,356 | B1 * | 10/2001 | Frederick et al. | 8/158 |
| 7,199,507 | B2 * | 4/2007 | Ganor et al. | 310/333 |
| 7,239,066 | B2 * | 7/2007 | Ott et al. | 310/339 |
| 7,282,838 | B2 * | 10/2007 | Zanella et al. | 310/339 |
| 7,573,143 | B2 * | 8/2009 | Frayne | 290/1 R |
| 7,808,158 | B1 * | 10/2010 | Deeds et al. | 310/339 |
| 7,811,048 | B2 * | 10/2010 | Allaei | 415/1 |
| 7,821,144 | B2 * | 10/2010 | Frayne | 290/1 R |
| 7,821,183 | B2 * | 10/2010 | Rastegar | 310/339 |
| 7,872,366 | B2 * | 1/2011 | Gray | 290/55 |
| 7,875,992 | B2 * | 1/2011 | Gray | 290/55 |
| 7,948,109 | B2 * | 5/2011 | Gray | 290/54 |
| 8,026,619 | B2 * | 9/2011 | Frayne | 290/1 R |
| 8,067,878 | B1 * | 11/2011 | Lu et al. | 310/339 |
| 8,102,072 | B2 * | 1/2012 | Tsou | 290/55 |
| 8,294,336 | B2 * | 10/2012 | Priya | 310/339 |

(Continued)

FOREIGN PATENT DOCUMENTS

JP         2003059319 A   *   2/2003

*Primary Examiner* — Pedro J Cuevas
(74) *Attorney, Agent, or Firm* — Muncy, Geissler, Olds & Lowe, PLLC

(57) ABSTRACT

A wind energy generator using a piezoelectric material and an auxiliary mechanism thereof are disclosed. The wind energy generator comprises the auxiliary mechanism and the piezoelectric material. The auxiliary mechanism comprises a wind collecting device and a wind driving device. The wind collecting device is used for collecting a wind and increasing the wind speed. The wind driving device cooperates with the wind collecting device to receive the wind. The piezoelectric material contacts with the wind driving device. When the wind collecting device receives the wind, the piezoelectric material is vibrated by the wind via the wind driving device to generate an electric power.

19 Claims, 11 Drawing Sheets

U.S. PATENT DOCUMENTS

| | | | |
|---|---|---|---|
| 2002/0192069 A1* | 12/2002 | Newman | 415/4.1 |
| 2005/0269907 A1* | 12/2005 | Erickson | 310/339 |
| 2005/0280334 A1* | 12/2005 | Ott et al. | 310/339 |
| 2006/0006764 A1* | 1/2006 | Ganor et al. | 310/328 |
| 2008/0129254 A1* | 6/2008 | Frayne | 322/3 |
| 2009/0309362 A1* | 12/2009 | Frayne | 290/44 |
| 2010/0052324 A1* | 3/2010 | Priya | 290/50 |
| 2010/0076316 A1* | 3/2010 | Hasegawa | 600/459 |
| 2010/0133847 A1* | 6/2010 | Allaei | 290/55 |
| 2010/0164231 A1* | 7/2010 | Tsou | 290/55 |
| 2010/0207395 A1* | 8/2010 | Frayne | 290/54 |
| 2011/0260453 A1* | 10/2011 | Frayne | 290/43 |
| 2011/0309723 A1* | 12/2011 | Lu et al. | 310/339 |
| 2013/0009469 A1* | 1/2013 | Gillett | 307/25 |

* cited by examiner

WIND ENERGY GENERATOR USING PIEZOELECTRIC MATERIAL AND AUXILIARY MECHANISM THEREOF

BACKGROUND OF THE INVENTION

1. Field of the Invention

The present invention relates to a wind energy generator using a piezoelectric material and an auxiliary mechanism thereof, and more particularly, to a wind energy generator using a piezoelectric material which can increase the speed of the collected wind and an auxiliary mechanism thereof.

2. Description of the Related Art

As technology advances, so is the requirement of energy in today's society. Currently fossil fuel still accounts for the majority of energy supply. However, as fossil fuel is running out of supply and has negative influence on the environment, the human society calls for substitutions and renewable energies, such as the wind power, to replace the fossil fuel. But using wind to generate power is still not efficient economically since the generated power level is low.

In the prior art technique, a piezoelectric material is disclosed, when the piezoelectric material is subject to an external mechanical pressure, a voltage is generated. Therefore, the kinetic energy generated by rotating or vibrating the piezoelectric material can be transformed by a piezoelectric energy harvesting device into an electric power. Furthermore, a wind energy generation means using the piezoelectric material is presented in the prior art; however, the piezoelectric material is used directly to receive the wind and to generate the electric power; and there are no detailed system functions and the evaluation of workability regarding to the application of the piezoelectric material. Besides, since a single piece of the piezoelectric material can generate only a small amount of power; even with a multiple pieces of piezoelectric material, the amount of power generated is still small and is not efficient if no auxiliary mechanism is provided or the electric power is not properly handled.

Therefore, it is necessary to provide a wind energy generator using a piezoelectric material and an auxiliary mechanism thereof to solve the problems encountered in the prior art.

SUMMARY OF THE INVENTION

It is an object of the present invention to provide a wind energy generator using a piezoelectric material which can increase the speed of the collected wind for the piezoelectric material to generate an electric power.

It is another object of the present invention to provide an auxiliary mechanism used in the wind energy generator.

In order to achieve the above objects, the present invention provides a wind energy generator using a piezoelectric material, which comprises an auxiliary mechanism and a piezoelectric material. The auxiliary mechanism comprises a wind collecting device and a wind driving device. The wind collecting device is used to collect a wind and increase the wind speed. The wind driving device cooperates with the wind collecting device to receive the wind; and the piezoelectric material contacts with the wind driving device. When the wind collecting device receives the wind, the piezoelectric material is vibrated by the wind via the wind driving device to generate an electric power.

The present invention also provides an auxiliary mechanism for a wind energy generator, wherein the wind energy generator generates an electric power by using a piezoelectric material. The auxiliary mechanism comprises a wind collecting device and a wind driving device. The wind collecting device is used to collect a wind and increase the wind speed. The wind driving device cooperates with the wind collecting device to receive the wind. The wind collecting device comprises an inlet, a partition, and a nozzle. The inlet receives the wind; the partition inclines an angle with respect to an incident angle of the wind to adjust a direction of the wind, and the nozzle has a cross section area smaller than that of the inlet for transmitting the wind. When the inlet receives the wind, a speed of the wind is increased by using the angle of the partition and the nozzle, and the wind driving device contacts with the piezoelectric material. When the wind collecting device receives the wind, the piezoelectric material is vibrated by the wind via the wind driving device to generate the electric power.

DETAILED DESCRIPTION OF THE PREFERRED EMBODIMENT

The advantages and innovative features of the invention will become more apparent from the following detailed description when taken in conjunction with the accompanying drawings.

Figure 1A:
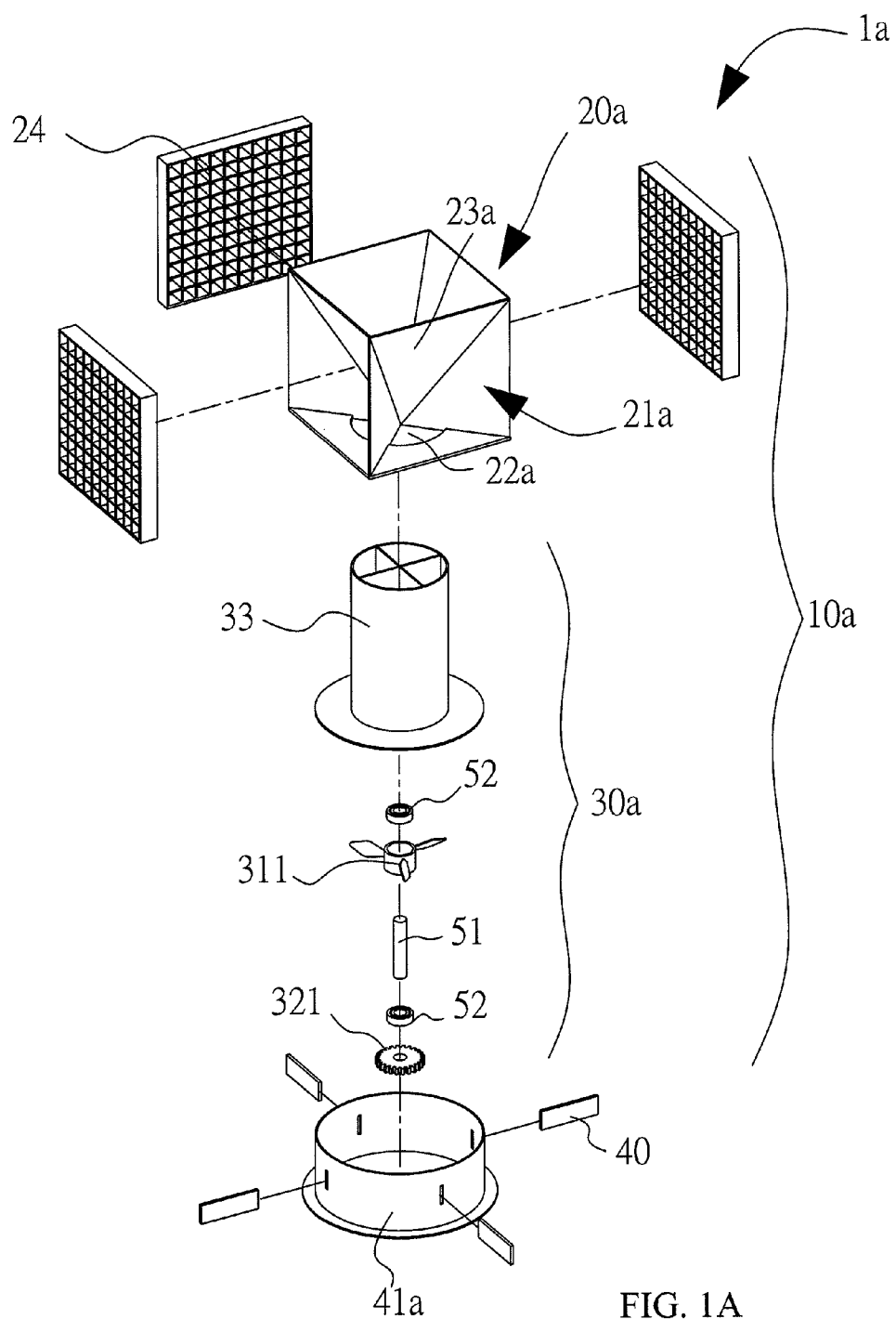
FIG. 1A illustrates a structural view of a first embodiment of a wind energy generator in the present invention.
Figure 1B:
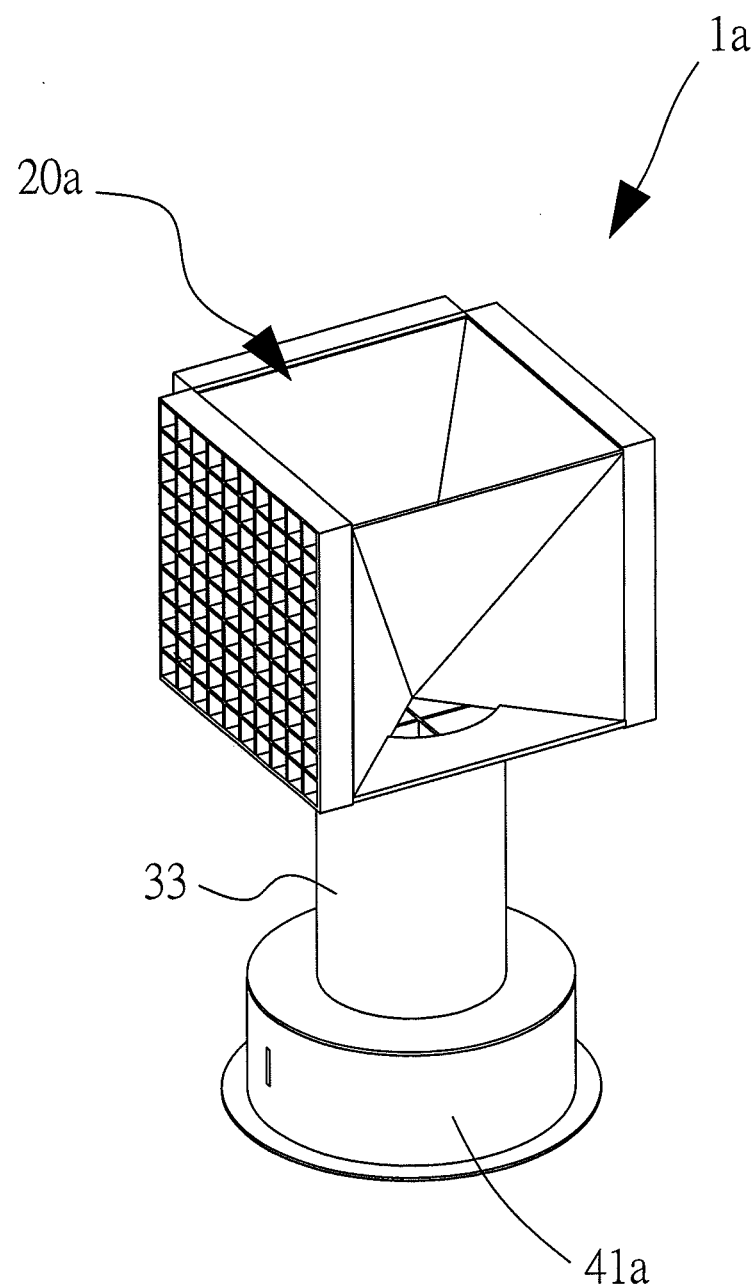
FIG. 1B illustrates an outer view of the first embodiment of the wind energy generator in the present invention.
Figure 1C:
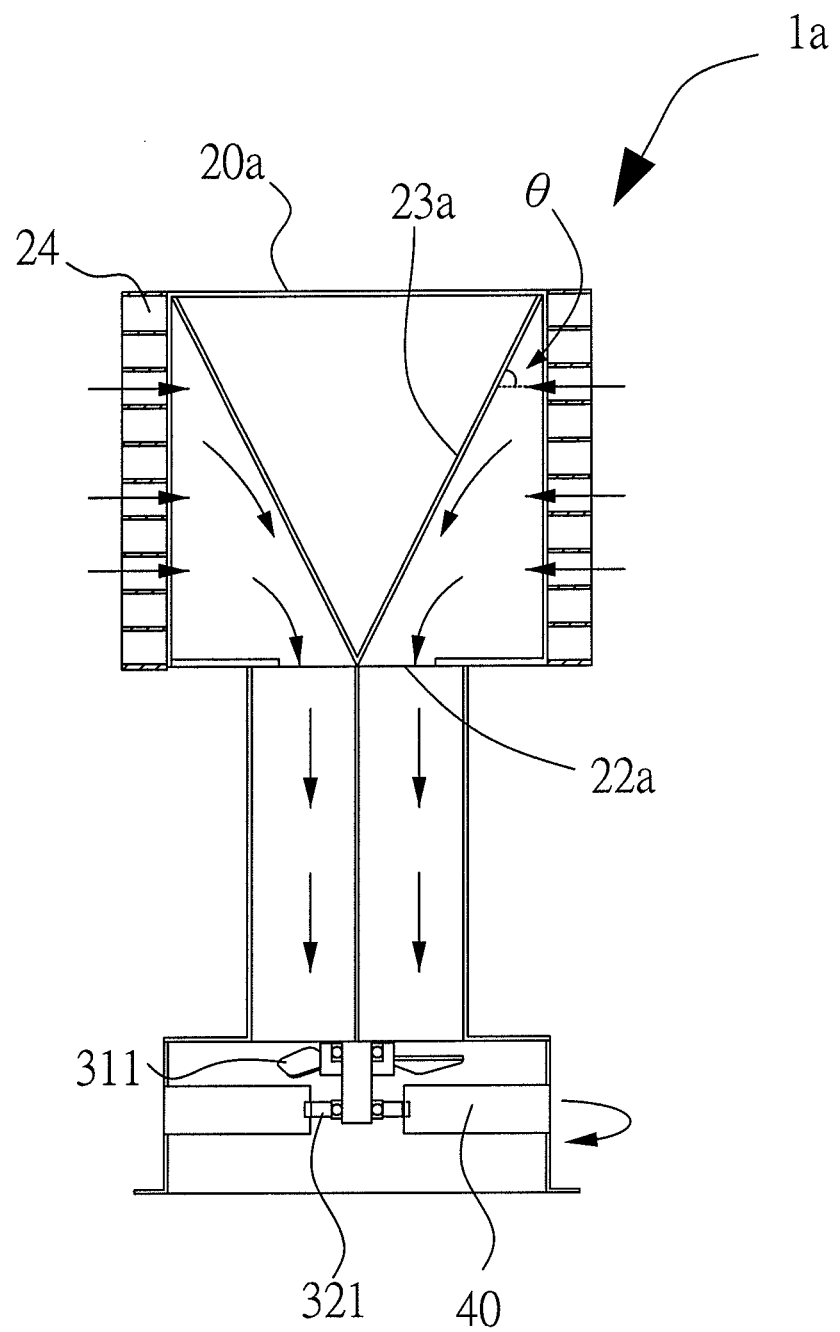
FIG. 1C illustrates an operation view of the first embodiment of the wind energy generator in the present invention.

Please refer to FIGS. 1A to 1C for a first embodiment of a wind energy generator in the present invention; FIG. 1A illustrates a structural view of the first embodiment of the wind energy generator in the present invention; FIG. 1B illustrates an outer view of the first embodiment of the wind energy generator in the present invention; and FIG. 1C illustrates an operation view of the first embodiment of the wind energy generator in the present invention.

The wind energy generator uses the vibration of the piezoelectric material to generate the electric power. In the first embodiment of the present invention, a wind energy generator 1a comprises an auxiliary mechanism 10a and a piezoelectric material 40. The auxiliary mechanism 10a comprises a wind collecting device 20a and a wind driving device 30a. The wind collecting device 20a receives and collects the wind to further increase the wind speed. The wind driving device 30 cooperates with the wind collecting device 20a to receive the accelerated wind from the wind collecting device 20a. The piezoelectric material 40 is fixed by a piezoelectric material fixing element 41a and contacts with the wind driving device 30a. In the first embodiment of the present invention, the wind energy generator 1a has four pieces of piezoelectric materials 40, but the wind energy generator 1a can have any number of piezoelectric materials 40 as well. When the wind collecting device 20a receives the wind, the wind driving device 30a vibrates the piezoelectric material 40 to generate the electric power by using the wind. In an embodiment of the present invention, the piezoelectric material 40 is a polyvinylidene fluoride (PVDF) piezoelectric film, and the piezoelectric material 40 can be similar material such as lead zircpmate titanate (PZT) and lead magnesium niobate (PMN), or other suitable materials.

In the first embodiment of the present invention, the wind collecting device 20a is a cubical structure, which comprises an inlet 21a, a nozzle 22a, and a partition 23a. The wind is received by the inlet 21a, and then transmitted by the nozzle 22a. The cross section area of the nozzle 22a is smaller than that of the inlet 21a to increase the wind speed. The partition 23a inclines an angle θ with respect to the incident angle of the wind to adjust the direction of the wind, making it possible for the wind collecting device 20a to concentrate the wind and to increase the wind speed. The inclined angle θ of the partition 23a with respect to the incident angle of the wind is in the range of 30 degrees to 60 degrees, in an preferred embodiment of the present invention, the angle θ is substantially 54 degrees; however, the range of the angle θ is not limited to 30 to 60 degrees, any angle that can help increase the wind speed can be used in the present invention.

The wind collecting device 20a further comprises a flow-guiding mechanism 24 adjacent to the inlet 21a. The flow-guiding mechanism 24 comprises a grid structure to ensure the incident angle of the wind is horizontal to the inlet 21a to optimize the wind speed when the wind is passed through the partition 23a and the nozzle 22a. Therefore, in a preferred embodiment of the present invention, the wind collecting device 20a can increase the wind speed to be fourteen times of the original wind speed.

In the first embodiment of the present invention, the wind driving device 30a comprises an axial fan 311, a gear mechanism 321, and a duct 33. The axial fan 311 is disposed on an axle 51 and coupled with the gear mechanism 321 and the duct 33 via a bearing 52. In the first embodiment of the present invention, the duct 33 is a cylindrical hollow tube corresponding to the shape of the nozzle 22a and is divided into four sections; however, the duct 33 is not limited to the shape shown in FIG. 1A and can be in other shapes.

FIG. 1C illustrates an operation view of the first embodiment of the wind energy generator in the present invention. When the wind is accelerated by the wind collecting device 20a, then it is transmitted through the duct 33 to rotate the axial fan 311. When the fan 311 is rotated, it will synchronously drive the gear mechanism 321 through the bearing 52. The gear mechanism 321 contacts with the piezoelectric material 40. When the gear mechanism 321 is rotated, it will vibrate the piezoelectric material 140, which is then electrically coupled with the charging circuit (not shown in figure) for storing the electric power generated by the piezoelectric material 40. Hence, the wind energy generator 1a can use the piezoelectric material 40 to generate the electric power.

Figure 2:
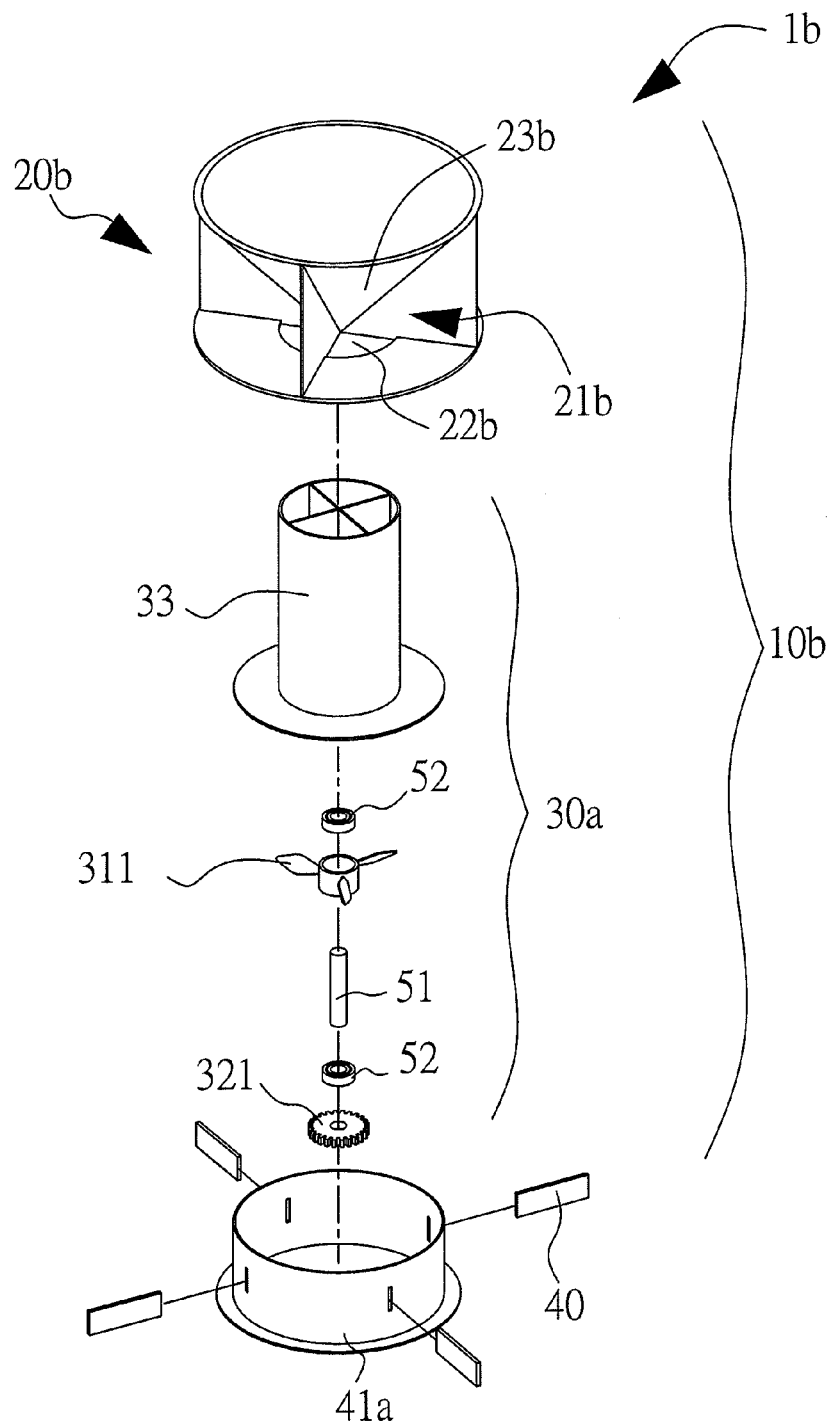
FIG. 2 illustrates a structural view of a second embodiment of the wind energy generator in the present invention.

FIG. 2 illustrates a structural view of a second embodiment of the wind energy generator in the present invention.

In the second embodiment of the present invention, the wind energy generator 1b comprises an auxiliary mechanism 10b and the piezoelectric material 40. The auxiliary mechanism 10b comprises a wind collecting device 20b and a wind driving device 30a. Compared with the first embodiment of the present invention, the second embodiment is different in that the wind collecting device 20b is a cylindrical structure. The wind collecting device 20b also comprises an inlet 21b, a nozzle 22b, and a partition 23b. Similar to the wind collecting device 20a of the first embodiment, the wind is received by the inlet 21b of the wind collecting device 20b, and then is transmitted by the nozzle 22; wherein the cross section area of the nozzle 22b is smaller than that of the inlet 21b. The partition 23b inclines an angle θ with respect to the incident angle of the wind to adjust the direction of the wind, making it possible for the wind collecting device 20b to concentrate the wind and to increase the wind speed. Since the wind driving device 30a is also used in the second embodiment and the appearance of the wind energy generator 1b is similar to that of the first embodiment, the operation principle is similar and will not be described. Therefore, the wind energy generator 1b can use the piezoelectric material 40 to generate an electric power.

Figure 3:
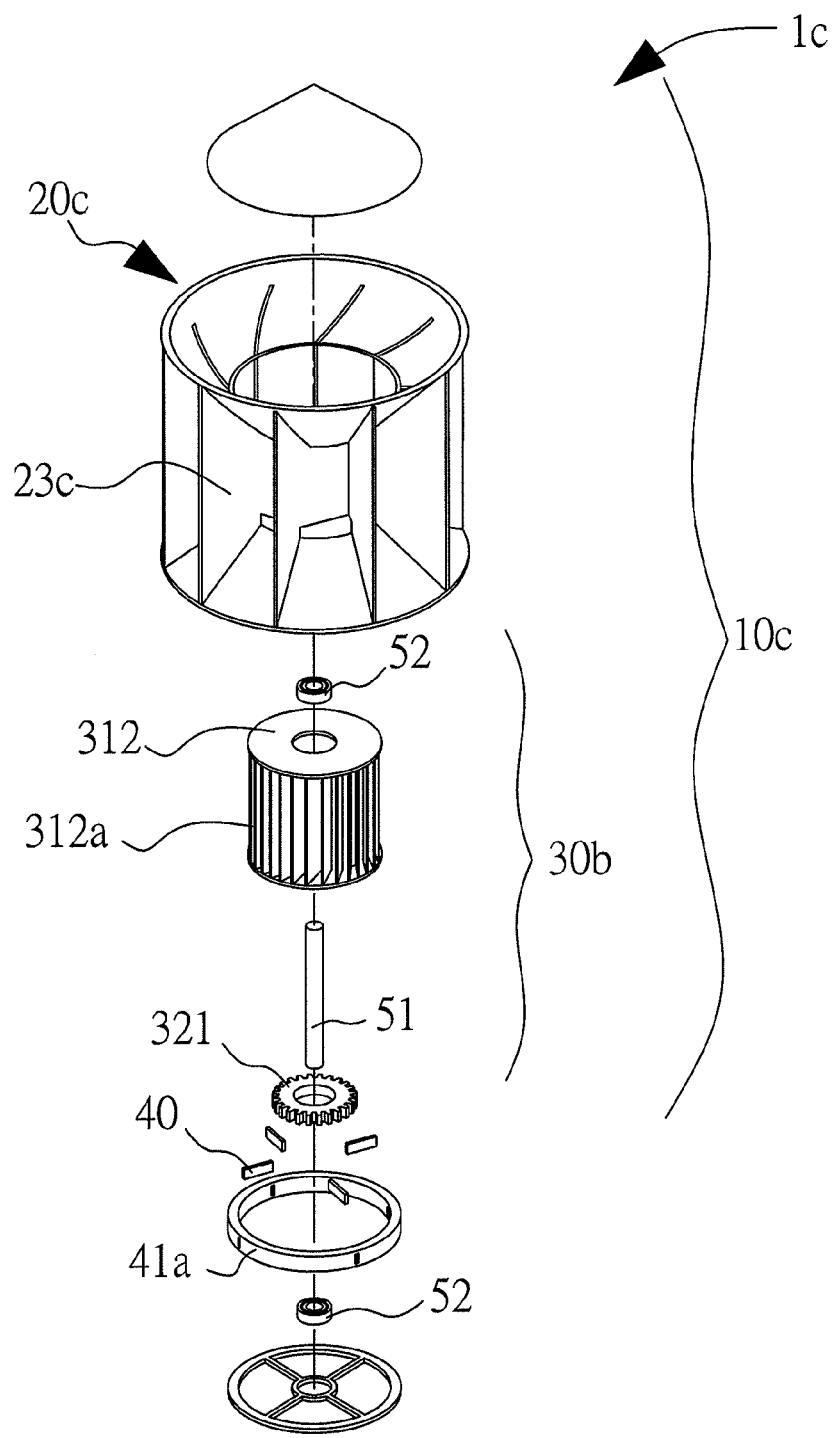
FIG. 3 illustrates a structural view of a third embodiment of the wind energy generator in the present invention.

FIG. 3 illustrates a structural view of a third embodiment of the wind energy generator in the present invention.

In the third embodiment of the present invention, the wind energy generator 1c comprises an auxiliary mechanism 10c and the piezoelectric material 40. The auxiliary mechanism 10c comprises a wind collecting device 20c and a wind driving device 30b. The wind driving device 30b comprises a roof turbine ventilator 312 and a gear mechanism 321. The wind collecting device 20c can be a cylindrical structure but has a different structure other than the wind collecting device 20b in the second embodiment. The partition 23c of the wind collecting device 20c is in the shape of a turbine to adjust the direction that the wind enters. The roof turbine ventilator 312 comprises a plurality of fan blades 312a disposed at the inner side of the wind collecting device 20c and rotated by the wind collected by the wind collecting device 20c. In a preferred embodiment of the present invention, the plurality of fan blades 312a has a angle substantially vertical to the incident angle of the wind so as to use the wind more efficiently to rotate the roof turbine ventilator 312. The rotated roof turbine ventilator 312 synchronously drives the gear mechanism 321 to rotate through the operations of the axle 51 and the bearing 52. The gear mechanism 321 contacts with the piezoelectric material 40. When the gear mechanism 321 is rotated, it vibrates the piezoelectric material 40 simultaneously. Therefore, the wind energy generator 1c can use the piezoelectric material 40 to generate the electric power.

Figure 4A:
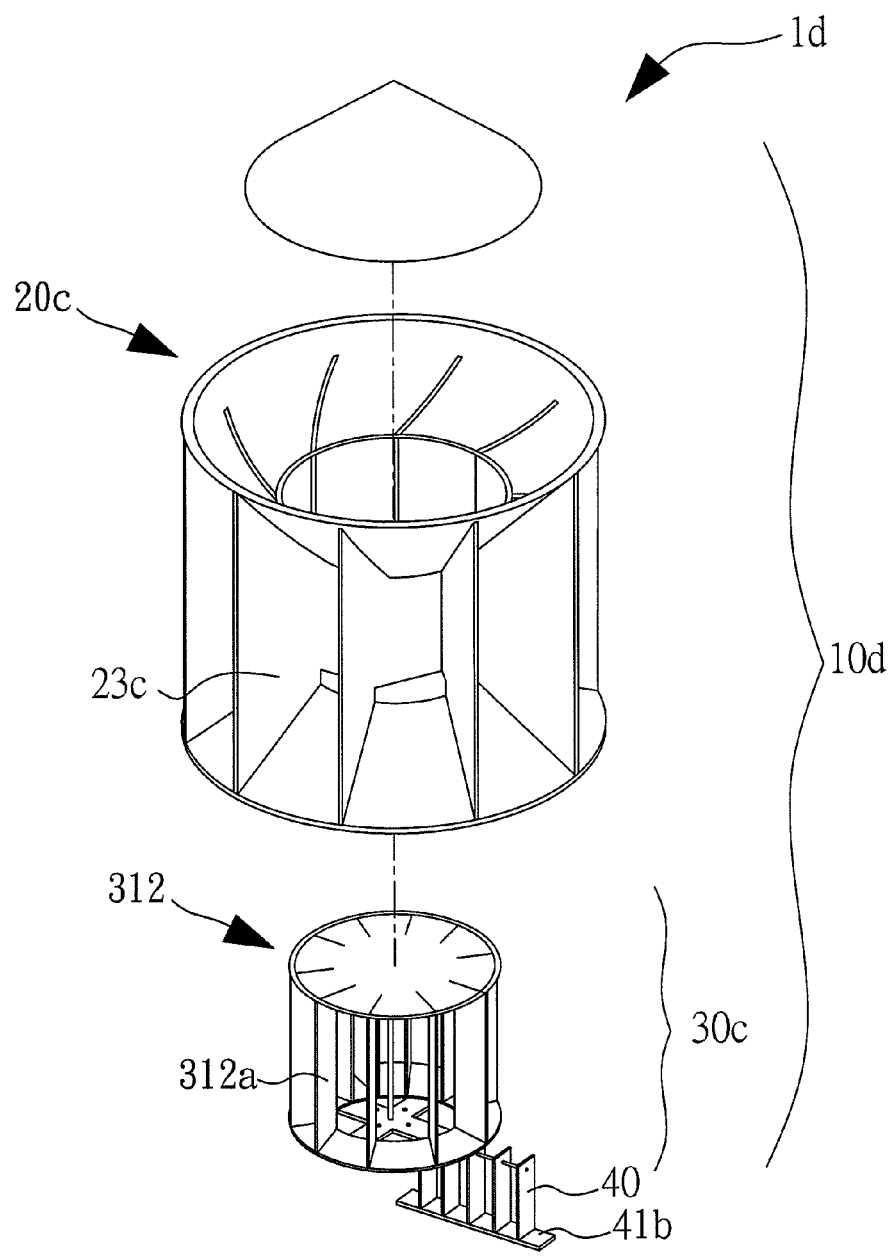
FIG. 4A illustrates a structural view of a fourth embodiment of the wind energy generator in the present invention.
Figure 4B:
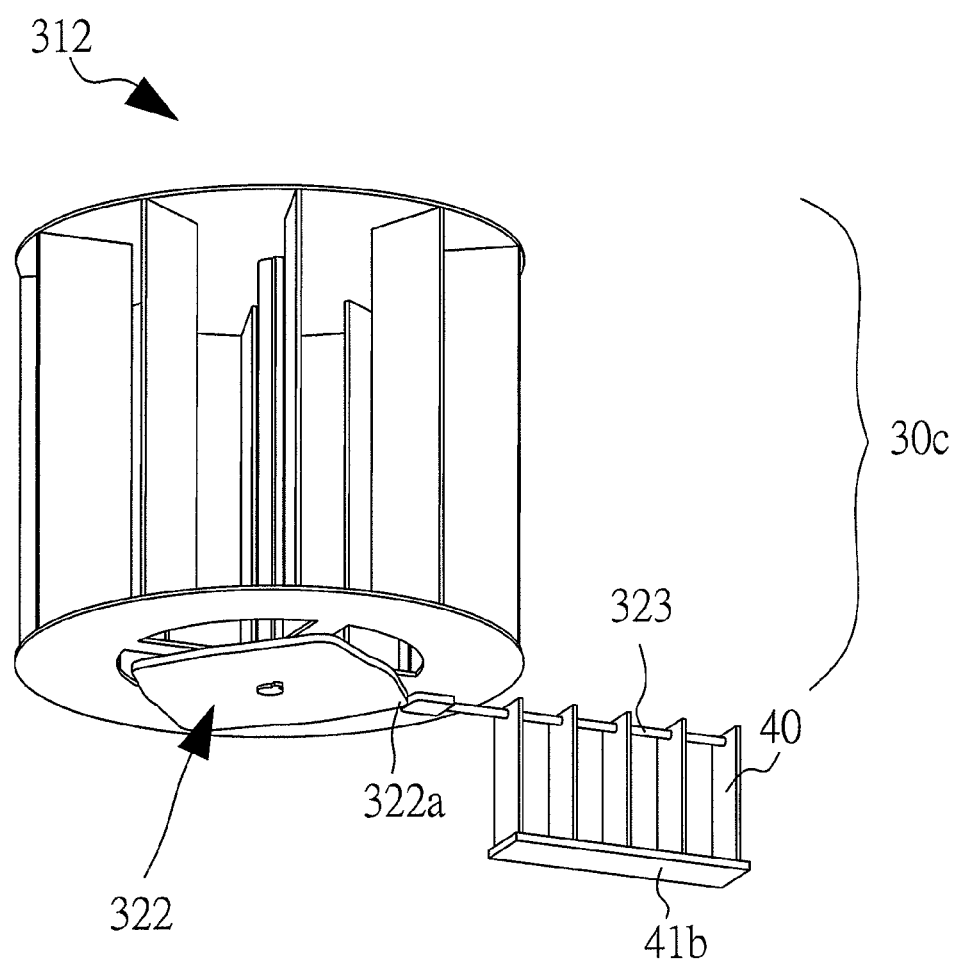
FIG. 4B illustrates views of a roof turbine ventilator and a piezoelectric material of the fourth embodiment of the wind energy generator in the present invention.

Please refer to FIG. 4A to 4B for a fourth embodiment of a wind energy generator in the present invention; FIG. 4A illustrates a structural view of a fourth embodiment of the wind energy generator in the present invention; and FIG. 4B illustrates views of a roof turbine ventilator and a piezoelectric material of the fourth embodiment of the wind energy generator in the present invention.

In the fourth embodiment of the present invention, the wind energy generator 1d comprises an auxiliary mechanism 10d and the piezoelectric material 40. The auxiliary mechanism 10c comprises the wind collecting device 20c and the wind driving device 30c. The wind collecting device 20c in FIG. 4 has the same structure as that in the FIG. 3 and will not be further described. The wind driving device 30c comprises the roof turbine ventilator 312, a driving disk 322 and a connecting cable 323. The roof turbine ventilator 312 is disposed at the inner side of the wind collecting device 20c to be rotated by the wind collected by the wind collecting device 20c. In the meantime, the roof turbine ventilator 312 connects with the driving disk 322; when the roof turbine ventilator 312 is rotated, it synchronously drives the driving disk 322 to rotate. The driving disk 322 is formed to have a plurality of protrusions 322a. The side of the driving disk 322 is connected with the connecting cable 323, which is connected with the piezoelectric material 40. One side of the piezoelectric material 40 is fixed to a piezoelectric material fixing element 41b, and the other side of the piezoelectric material 40 is connected with the connecting cable 323. When the driving disk 322 is rotated, the plurality of protrusions 322a drives the connecting cable 323 to vibrate the piezoelectric material 40. Therefore, the wind energy generator 1d can use the piezoelectric material 40 to generate the electric power.

Figure 4C:
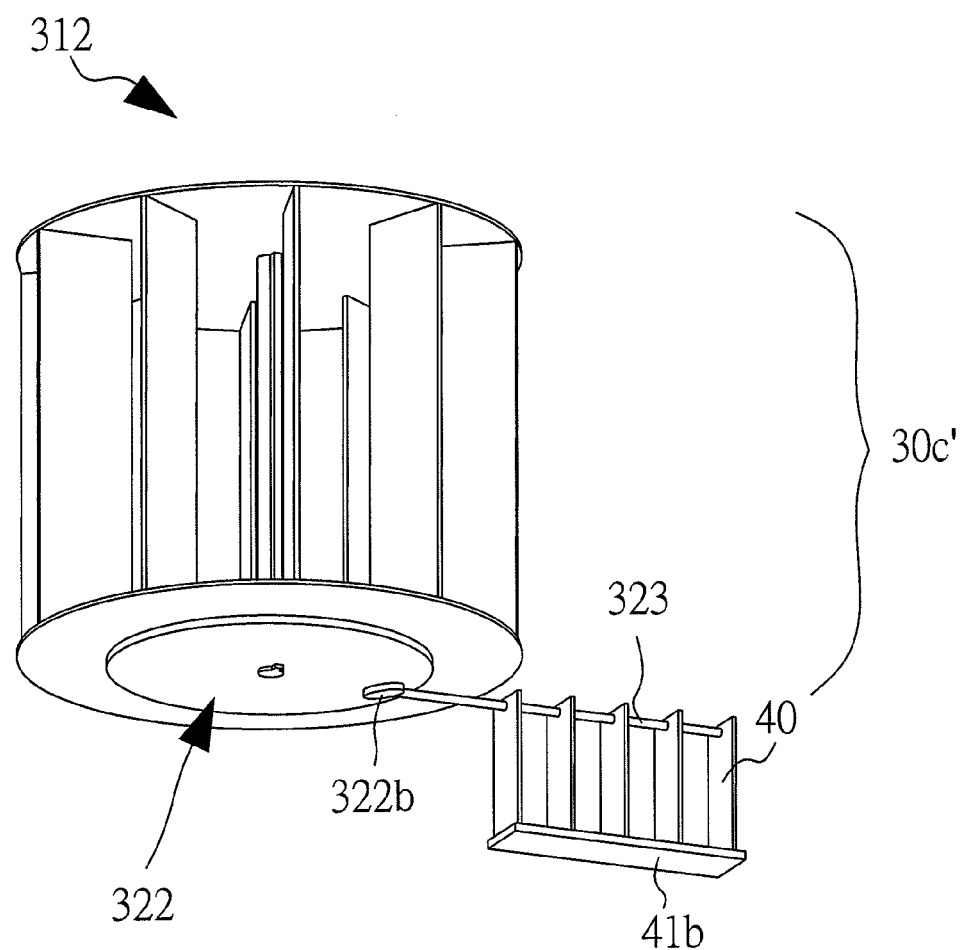
FIG. 4C illustrates views of a roof turbine ventilator and a piezoelectric material of a fifth embodiment of the wind energy generator in the present invention.

FIG. 4C illustrates views of a roof turbine ventilator and a piezoelectric material of a fifth embodiment of the wind energy generator in the present invention.

In the fifth embodiment of the present invention, the wind driving device 30c' comprises the roof turbine ventilator 312, the driving disk 322, and the connecting cable 323; the driving disk 322 comprises a cam mechanism 322b. The cam mechanism 322b connects with the connecting cable 323; then the connecting cable 323 connects to the piezoelectric material 40. When the driving disk 322 is rotated, the cam mechanism 322b drives the connecting cable 323 to rotate to vibrate the piezoelectric material 40, thereby causing the piezoelectric material 40 to generate the electric power. The difference between the fifth embodiment and the fourth embodiment is that the cam mechanism 322b is used to drive the connecting cable 323 in the fifth embodiment; the rest part of the wind energy generator will not be further described for the sake of brevity.

Figure 5A:
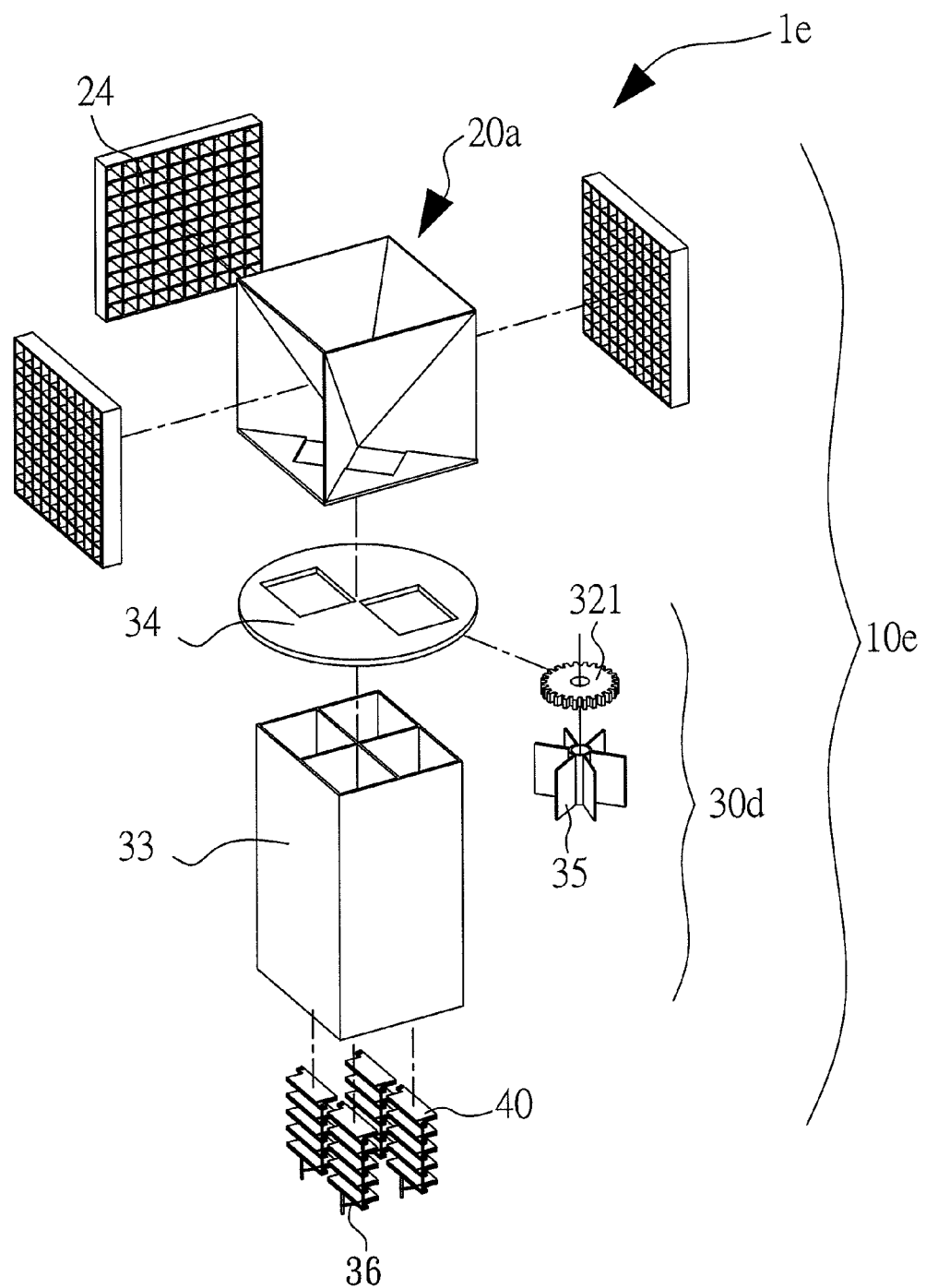
FIG. 5A illustrates a structural view of a sixth embodiment of the wind energy generator in the present invention.
Figure 5B:
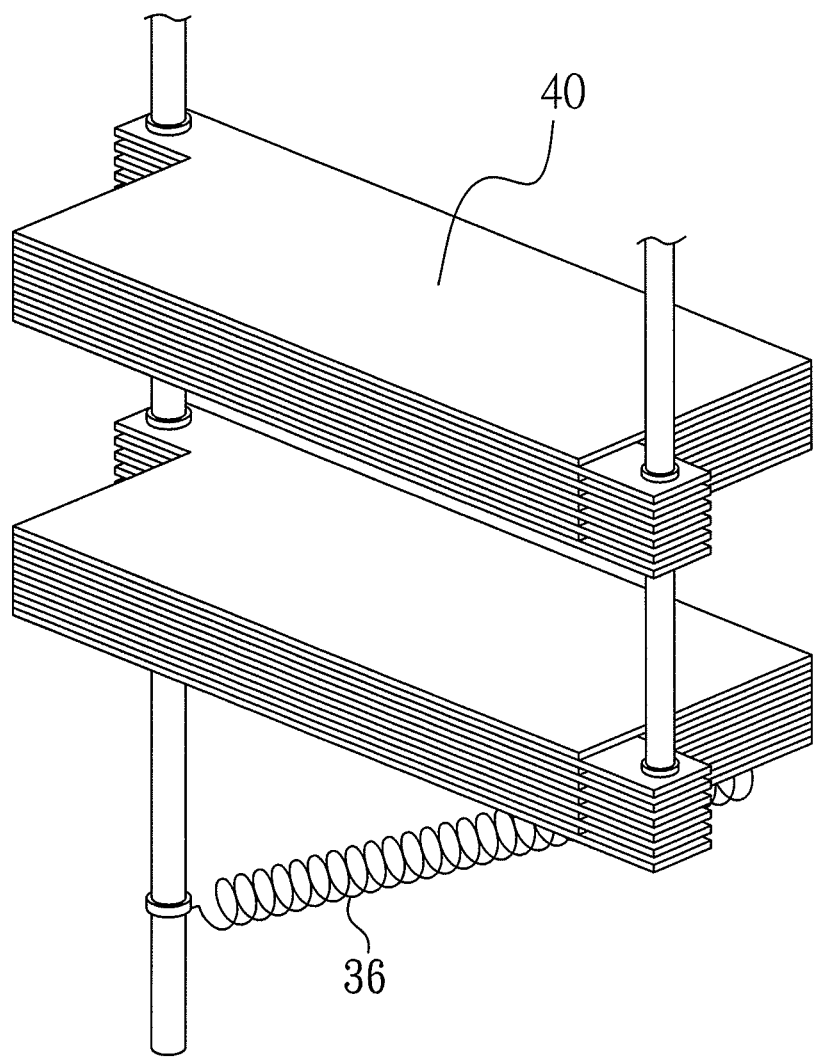
FIG. 5B illustrates a view of a piezoelectric material of the sixth embodiment of the wind energy generator in the present invention.

Please refer to FIG. 5A to 5B for a sixth embodiment of a wind energy generator in the present invention; FIG. 5A illustrates a structural view of the sixth embodiment of the wind energy generator in the present invention; and FIG. 5B illustrates a view of a piezoelectric material of the sixth embodiment of the wind energy generator in the present invention.

In the sixth embodiment of the present invention, the wind energy generator 1e comprises an auxiliary mechanism 10e and the piezoelectric material 40; the auxiliary mechanism 10e comprises the wind collecting device 20a and the wind driving device 30d. Since the wind collecting device 20a used here is similar to that used in the first embodiment, it will not be further described for the sake of brevity. The wind driving device 30d comprises the gear mechanism 321, the duct 33, an open-closed mechanism 34, a fan 35, and an elastic element 36. The open-closed mechanism 34 is disposed between the wind collecting device 20a and the duct 33, wherein the open-closed mechanism 34 of the wind energy generator 1e rotates to let the wind intermittently enter one of the tubes of the duct 33. It is noted that the cross section areas of the nozzle 22a of the wind collecting device 20a, the outlet of the open-closed mechanism 34, and the tubes of the duct 33 correspond with each other to let the wind from the nozzle 22a to completely enter the tubes of the duct 33.

The fan 35 mutually connects with the gear mechanism 321, and the gear mechanism 321 cooperates with the open-closed mechanism 34. The fan 35 is rotated by the surrounding wind. When the fan 35 is driven by the surrounding wind, it will drive the gear mechanism 321 to further drive the open-closed mechanism 34 to operate. Therefore, when the wind passes through the wind collecting device 20a, it intermittently enters one of the tubes of the duct 33.

The piezoelectric material 40 is disposed at the inner side of the duct 33 and connected with the elastic element 36, as shown in FIG. 5B. The elastic element 36 can be a spring or other components having elastic properties. When the wind enters the duct 33, it drives to the piezoelectric material 40 to swing; when the wind vanishes, the piezoelectric material 40 will return to its original shape and position by means of the elastic force of the elastic element 36. Therefore, the piezoelectric material 40 is vibrated continuously by using the open-closed mechanism 34 and the elastic element 36 to generate the electric power.

In order to improve the power generating efficiency of the piezoelectric material 40 in the present invention, the piezoelectric material 40 can comprise a plurality of polyvinylidene fluoride (PVDF) piezoelectric films stacked and connected in parallel, as shown in FIG. 5B. Finally, the piezoelectric material 40 is electrically coupled with the charging circuit 60 (as shown in FIG. 6).

It is noted that the piezoelectric material 40 comprising the plurality of PVDF piezoelectric films in the sixth embodiment can be used in the first to fifth embodiment; and other types of piezoelectric films can be used in the present invention.

Figure 6:
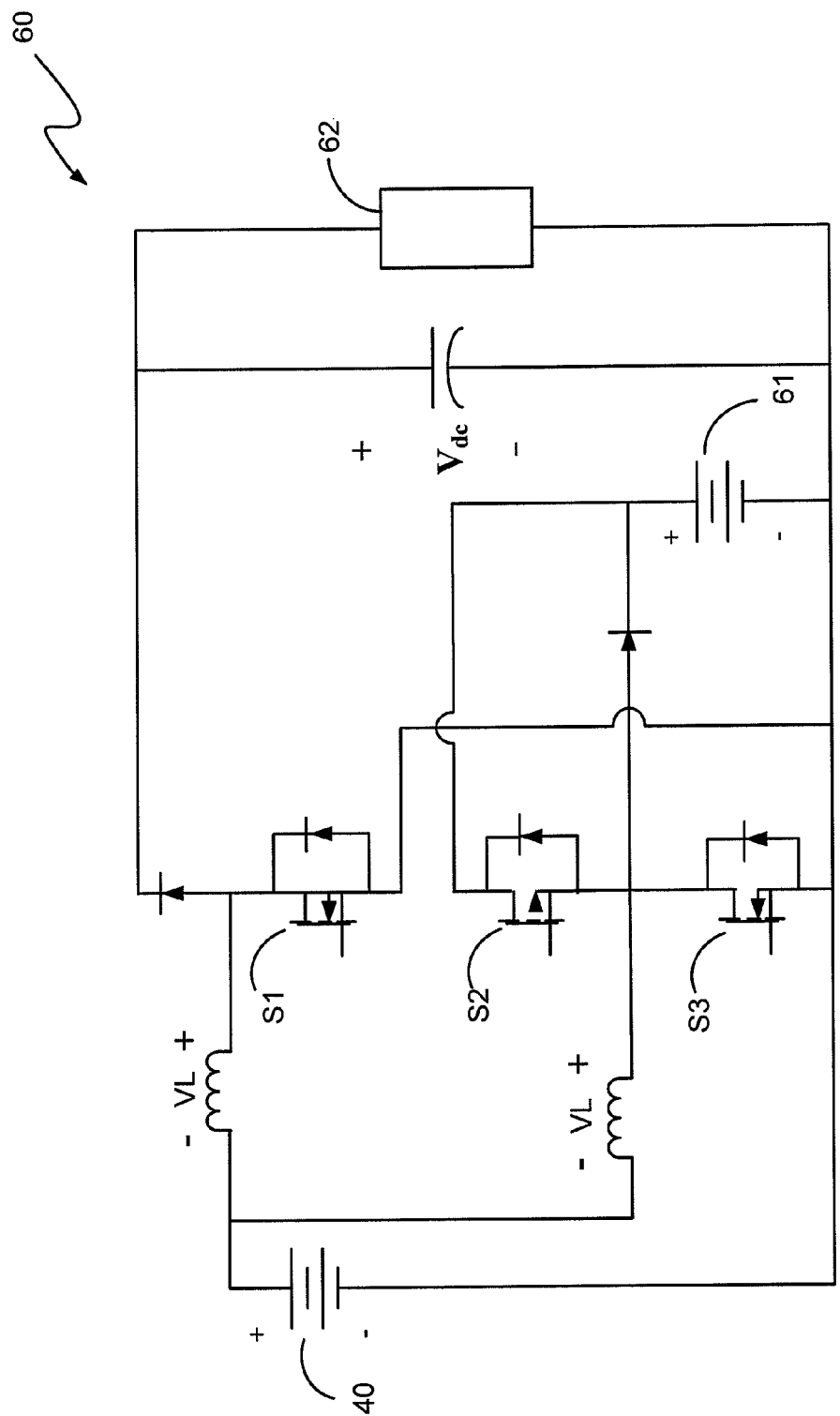
FIG. 6 illustrates a circuit diagram of a charging circuit of the wind energy generator.

FIG. 6 illustrates a circuit diagram of a charging circuit of the wind energy generator.

The charging circuit 60 is electrically coupled with the piezoelectric material 40; the charging circuit 60 comprises a power storing unit 61, a load 62, a first switch S1, a second switch S2, and a third switch S3. When the piezoelectric material 40 generates enough electric power (the voltage level is high), the first switch S1 is turned on and the second switch S2 and third switch S3 are turned off. Therefore, the electric power generated by the piezoelectric material 40 is directly transmitted to the load 62.

Additionally, the first switch S1 and the second switch S2 can be turned on and the third switch S3 can be turned off to transmit the electric power generated by the piezoelectric material 40 to the power storing unit 61 to store the electric power. When the electric power generated by the piezoelectric material 40 is low, the first switch S1 and the third switch S3 can be turned on and the second switch S2 can be turned off to let the electric power generated by the piezoelectric material 40 and the electric power stored by the power storing unit 61 to be supplied to the load 62 at the same time, thereby proving enough electric power to the load 62.

As described above, the charging circuit 60 can control the electric power supplied to the load 62 based on the amount of the electric power generated by the piezoelectric material 40 and can manage the electric power generated by the piezoelectric material 40 more efficiently.

As illustrated in the first embodiment through the sixth embodiment, the wind energy generators 1a, 1b, 1c, 1d, and 1e can use the piezoelectric material to generate the electric power and can use the auxiliary mechanisms 10a, 10b, 10c, 10d, and 10e to increase the wind speed, and then can use the charging circuit 60 to manage the electric power generated by the piezoelectric material 40 to solve the problem of having low power generating efficiency in using the piezoelectric material directly in the prior art.

It is noted that the above-mentioned embodiments are only for illustration, it is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A wind energy generator using a piezoelectric material, comprising:
   an auxiliary mechanism comprising:

a wind collecting device for collecting a wind and increasing the wind speed;

a wind driving device cooperating with the wind collecting device to receive the wind; and the piezoelectric material contacting with the wind driving device, when the wind collecting device receives the wind, the piezoelectric material is vibrated by the wind via the wind driving device to generate an electric power.

2. The wind energy generator using a piezoelectric material as claimed in claim 1, wherein the wind collecting device is a cubical structure or a cylindrical structure.

3. The wind energy generator using a piezoelectric material as claimed in claim 2, wherein the wind collecting device comprises:

an inlet for receiving the wind;

a partition inclining an angle with respect to an incident angle of the wind to adjust a direction of the wind; and a nozzle having a cross section area smaller than that of the inlet for transmitting the wind, when the inlet receives the wind, a speed of the wind is increased by using the angle of the partition and the nozzle.

4. The wind energy generator using a piezoelectric material as claimed in claim 3, wherein the angle is substantially 54 degrees.

5. The wind energy generator using a piezoelectric material as claimed in claim 3, wherein the inlet of the wind collecting device is connected with a flow-guiding mechanism.

6. The wind energy generator using a piezoelectric material as claimed in claim 1, wherein the wind driving device comprises:

an axial fan rotated by the wind; and a gear mechanism mutually connecting with the axial fan and contacting with the piezoelectric material to be connected with the wind driving device, wherein the axial fan is rotated by the wind and rotates the gear mechanism synchronously to vibrate the piezoelectric material to generate the electric power.

7. The wind energy generator using a piezoelectric material as claimed in claim 6 further comprising a duct.

8. The wind energy generator using a piezoelectric material as claimed in claim 1, wherein the wind driving device comprises:

a roof turbine ventilator having a plurality of fan blades rotated by the wind; and a gear mechanism mutually connecting with the roof turbine ventilator and contacting with the piezoelectric material to be connected with the wind driving device, wherein the roof turbine ventilator is rotated by the wind and rotates the gear mechanism synchronously to vibrate the piezoelectric material to generate the electric power.

9. The wind energy generator using a piezoelectric material as claimed in claim 1, wherein the wind driving device comprises:

a roof turbine ventilator having a plurality of fan blades rotated by the wind; and a driving disk having a plurality of protrusions, the driving disk mutually connecting with the roof turbine ventilator and having the plurality of protrusions coupled with the piezoelectric material via a connecting cable, when the roof turbine ventilator is rotated, the plurality of protrusions drives the connecting cable to vibrate the piezoelectric material to generate the electric power.

10. The wind energy generator using a piezoelectric material as claimed in claim 1, wherein the wind driving device comprises:

a roof turbine ventilator having a plurality of fan blades rotated by the wind; and a driving disk having a cam mechanism, the driving disk mutually connecting with the roof turbine ventilator and the cam mechanism connecting with the piezoelectric material via a connecting cable, when the roof turbine ventilator is rotated, the cam mechanism of the drives the connecting cable to vibrate the piezoelectric material to generate the electric power.

11. The wind energy generator using a piezoelectric material as claimed in claim 1, wherein the wind driving device comprises:

a duct for transmitting the wind;

an open-closed mechanism disposed between the wind collecting device and the duct to let the wind intermittently enter the duct;

a fan rotated by a surrounding wind; and a gear mechanism for connecting with the fan and cooperating with the open-closed mechanism, when the fan is rotated, the fan drives the open-closed mechanism via the gear mechanism, wherein the piezoelectric material is disposed at an inner side of the duct and connected with a elastic element, when the wind collecting device receives the wind, the piezoelectric material is vibrated by the operations of the open-closed mechanism and the elastic element to generate the electric power.

12. The wind energy generator using a piezoelectric material as claimed in claim 1, wherein the piezoelectric material comprises a plurality of polyvinylidene fluoride (PVDF) piezoelectric films stacked and connected in parallel.

13. An auxiliary mechanism for a wind energy generator, wherein the wind energy generator generates an electric power by using a piezoelectric material, the auxiliary mechanism comprising:

a wind collecting device for collecting a wind and increasing the wind speed, the wind collecting device comprising:

an inlet for receiving the wind;

a partition inclining an angle with respect to an incident angle of the wind to adjust a direction of the wind; and a nozzle having a cross section area smaller than that of the inlet for transmitting the wind, when the inlet receives the wind, a speed of the wind is increased by using the angle of the partition and the nozzle; and a wind driving device cooperating with the wind collecting device to receive the wind and contacting with the piezoelectric material, when the wind collecting device receives the wind, the piezoelectric material is vibrated by the wind via the wind driving device to generate the electric power.

14. The auxiliary mechanism as claimed in claim 13, wherein the wind collecting device comprises a cubical structure or a cylindrical structure.

15. The auxiliary mechanism as claimed in claim 13, wherein the angle is substantially 54 degrees.

16. The auxiliary mechanism as claimed in claim 13, wherein the inlet of the wind collecting device is connected with a flow-guiding mechanism.

17. The auxiliary mechanism as claimed in claim 13, wherein the wind driving device comprises:

an axial fan rotated by the wind; and a gear mechanism mutually connecting with the axial fan and contacting with the piezoelectric material to be connected with the wind driving device, wherein the axial fan is rotated by the wind and rotates the gear mechanism synchronously to vibrate the piezoelectric material to generate the electric power.

18. The auxiliary mechanism as claimed in claim 17 further comprising a duct.

19. The auxiliary mechanism as claimed in claim 13, wherein the wind driving device comprises:
- a duct for transmitting the wind;
- an open-closed mechanism disposed between the wind collecting device and the duct to let the wind intermittently enter the duct;
- a fan rotated by a surrounding wind; and
- a gear mechanism for connecting with the fan and cooperating with the open-closed mechanism, when the fan is rotated, the fan drives the open-closed mechanism via the gear mechanism, wherein the piezoelectric material is disposed at an inner side of the duct and connected with a elastic element, when the wind collecting device receives the wind, the piezoelectric material is vibrated by the operations of the open-closed mechanism and the elastic element to generate the electric power.

\* \* \* \* \*